United States Patent
Labuhn et al.

(10) Patent No.: US 8,131,442 B2
(45) Date of Patent: Mar. 6, 2012

(54) METHOD FOR OPERATING A CRUISE CONTROL SYSTEM FOR A VEHICLE

(75) Inventors: Pamela I. Labuhn, Shelby Township, MI (US); Charles A. Green, Canton, MI (US); James N. Nickolaou, Clarkston, MI (US); Patrick J. O'Leary, Clinton Township, MI (US); Daniel J. Bartz, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1116 days.

(21) Appl. No.: 11/946,556

(22) Filed: Nov. 28, 2007

(65) Prior Publication Data

US 2009/0138168 A1 May 28, 2009

(51) Int. Cl.
*B60K 31/06* (2006.01)

(52) U.S. Cl. .......................................... 701/93; 180/170

(58) Field of Classification Search ................ 701/93, 701/97, 98; 180/170
See application file for complete search history.

(56) References Cited

U.S. PATENT DOCUMENTS

| | | | |
|---|---|---|---|
| 5,064,015 A * | 11/1991 | Yamamoto et al. | 180/176 |
| 5,454,442 A | 10/1995 | Labuhn et al. | |
| 6,223,117 B1 | 4/2001 | Labuhn et al. | |
| 6,622,810 B2 | 9/2003 | Labuhn et al. | |
| 2003/0045990 A1 * | 3/2003 | Adachi | 701/96 |
| 2009/0018723 A1 * | 1/2009 | Chevion et al. | 701/36 |

* cited by examiner

*Primary Examiner* — Kevin Hurley
(74) *Attorney, Agent, or Firm* — Lionel D. Anderson; Reising Ethington P.C.

(57) ABSTRACT

A method for operating a cruise control system for a vehicle. The method can identify certain low speed environments, like parking lots, where usage of the cruise control system is usually inappropriate and can disable the system accordingly. According to one embodiment, a full speed range adaptive (FSRA) cruise control system compares a steering wheel position to a steering wheel threshold to determine if the vehicle is operating in an inappropriate low speed environment and, if so, disables the cruise control system accordingly.

9 Claims, 5 Drawing Sheets

METHOD FOR OPERATING A CRUISE CONTROL SYSTEM FOR A VEHICLE

TECHNICAL FIELD

The present invention generally relates to cruise control systems for vehicles and, more particularly, to cruise control systems that are capable of operating in certain low speed environments.

BACKGROUND

An adaptive cruise control (ACC) system, sometimes called an autonomous, active or intelligent cruise control system, generally maintains a source vehicle at a driver-selected vehicle speed (speed control setting) until a slower moving lead vehicle is sensed ahead. If a slower moving lead vehicle is detected, the ACC system automatically switches from the speed control setting to one where the source vehicle is decelerated and accelerated in order to maintain a certain distance between it and the lead vehicle (headway control setting). Traditionally, some ACC systems could only operate above certain vehicle speeds, such as 25 mph for instance.

In order to provide a fuller range of operation, ACC systems have been developed that can operate at lower vehicle speeds, including in some instances all the way down to a complete vehicle stop. These systems are sometimes referred to as full speed range adaptive (FSRA) cruise control systems.

SUMMARY OF THE INVENTION

According to one aspect, there is provided a method for operating a cruise control system for a vehicle. The method generally comprises the steps: (a) receiving steering input from a steering wheel sensor, wherein the steering input generally pertains to a steering wheel position; (b) comparing the steering wheel position to a steering wheel threshold to determine if the vehicle is operating in an inappropriate low speed environment; and (c) disabling the cruise control system if the vehicle is operating in an inappropriate low speed environment.

According to another aspect, there is provided a method for operating a cruise control system for a vehicle. The method generally comprises the steps: (a) receiving speed input from a vehicle speed sensor, wherein the speed input generally pertains to a vehicle speed; (b) utilizing the speed input and input from at least one other vehicle sensor to determine if the vehicle is operating in an inappropriate low speed environment, wherein this determination is generally made without the use of electronic map data; and (c) disabling the cruise control system if the vehicle is operating in an inappropriate low speed environment.

According to another aspect, there is provided a cruise control system for use with a vehicle. The system generally comprises: an adaptive cruise computer; a vehicle speed sensor coupled to the adaptive cruise computer; and a steering wheel sensor coupled to the adaptive cruise computer. The adaptive cruise computer disables the cruise control system if the vehicle speed is less than a low speed threshold and the steering wheel position is greater than a steering wheel threshold.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

The method described herein generally pertains to features of a cruise control system that can identify certain low speed environments, like parking lots, where usage of cruise control is usually inappropriate. Generally, the present method utilizes various vehicle sensors to determine when the vehicle is operating in an inappropriate low speed environment and, if detected, disables the cruise control system and informs the vehicle user as to why this action has been taken. Although the following description is directed to an embodiment where the present method is used in conjunction with an FSRA cruise control system, it should be appreciated that the present method could also be used with non-FSRA cruise control systems including ACC systems and traditional non-ACC cruise control systems. The term 'full speed range adaptive (FSRA) cruise control system' broadly refers to a type or category of adaptive cruise control (ACC) systems that is capable of operating in low speed environments, but not necessarily down to a complete vehicle stop.

Cruise Control System—

Figure 1:
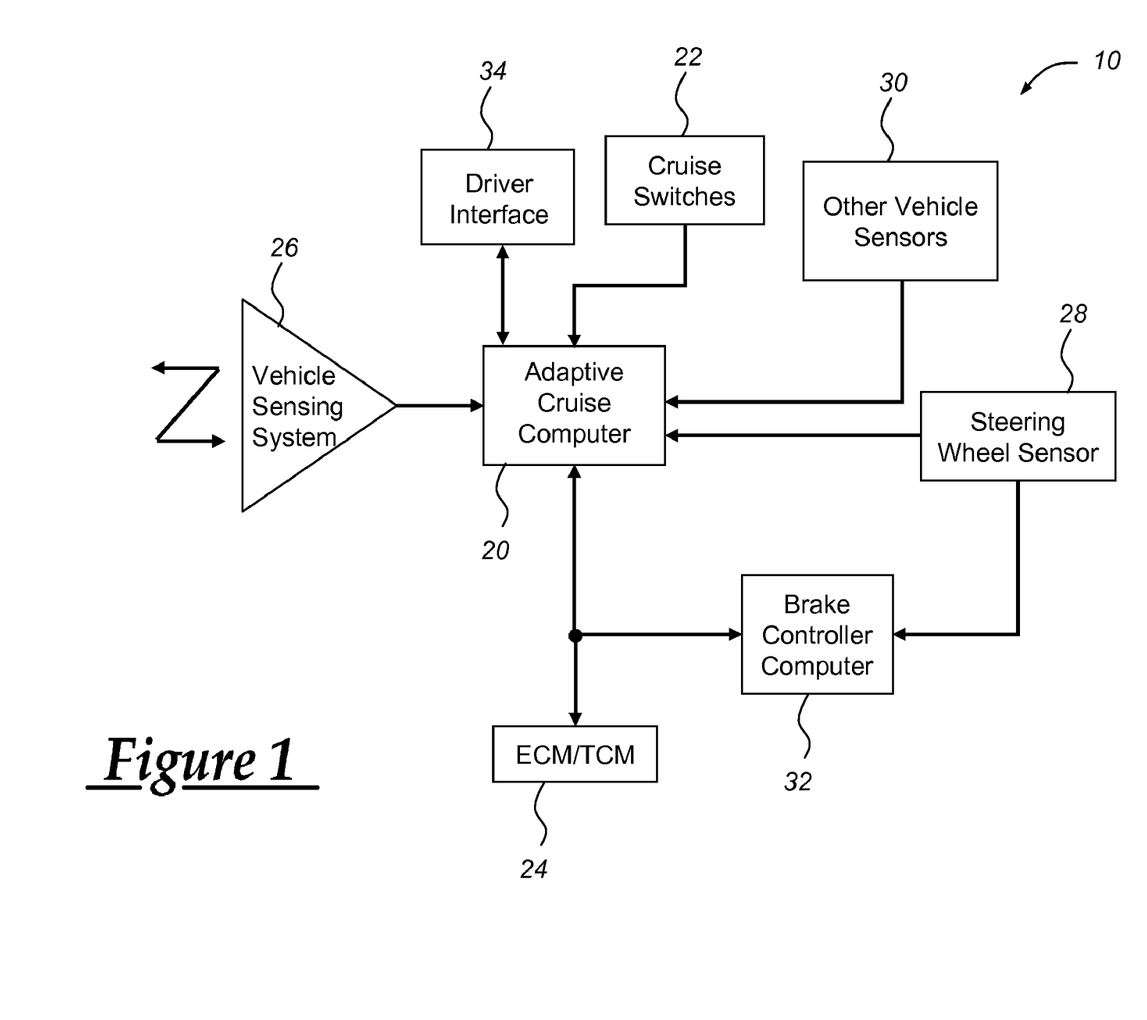
FIG. 1 is a block diagram of an exemplary cruise control system that is capable of implementing the present method.

With reference to FIG. 1, there is shown a block diagram of an exemplary cruise control system 10 capable of implementing the present method. It should, of course, be appreciated that other cruise control systems can also implement and utilize the method described herein, and that system 10 is but one example. Cruise control system 10 is preferably an FSRA system capable of operating in certain low speed environments and includes an adaptive cruise computer 20 coupled to cruise switches 22, an engine and/or transmission control module (ECM/TCM) 24, a vehicle sensing system 26, a steering wheel sensor 28, other vehicle sensors 30, a brake controller computer 32, and a driver interface 34.

Adaptive cruise computer 20 performs many of the electronic processing functions of system 10 and receives information from a variety of inputs such as cruise switches 22, ECM/TCM 24, vehicle sensing system 26, steering wheel sensor 28, and other vehicle sensors 30. In response to these inputs, adaptive cruise computer 20 executes electronic instructions—including ones pertinent to the present method—and outputs commands to devices such as ECM/TCM 24, brake control computer 32, and driver interface 34 that generally control cruise control system 10.

Cruise switches 22 are preferably operator-controlled components located on a steering wheel or control stalk, and can include an 'on/off' switch, a 'set speed' switch, a 'resume/accelerate' switch, a 'cancel' switch, as well as any other suitable switches and/or controls known in the art. Cruise switches 22 are electronically coupled to adaptive cruise computer 20 and provide it with switch input that generally conveys the status of the different switches. For example, if the driver puts the on/off switch into an 'on' position, then cruise switches 22 send one or more signals to adaptive cruise computer 20 to communicate that selection. The switch input can include any combination of electronic data that is generally representative of the status or state of one or more of the cruise switches 22.

If cruise control system 10 is being operated in a speed control setting, then adaptive cruise computer 20 can simply use the switch input, including a driver-selected vehicle speed, to generate control signals or output for ECM/TCM 24 and/or brake controller computer 32 so that the vehicle is maintained at the desired speed. Various techniques can be used for calculating and providing these control signals, as is appreciated by those skilled in the art.

If, on the other hand, cruise control system 10 is being operated in a headway control setting, then adaptive cruise computer 20 may need to collect input from additional vehicle sensors, like vehicle sensing system 26. According to one embodiment, vehicle sensing system 26 uses radar to sense both the distance and the relative speed of a lead vehicle traveling in a pathway in front of the source vehicle. However, other non-radar-based types of vehicle sensing systems like those that use lasers, cameras, vehicle-to-vehicle communications, and infrastructure-to-vehicle communications, could also be used. In response to this input from vehicle sensing system 26, adaptive cruise computer 20 sends control signals to ECM/TCM 24 and/or brake controller computer 32 so that a certain spatial separation is maintained between the two vehicles. This spatial separation or distance can be influenced by a variety of factors, including the current vehicle speed (higher speeds may require greater separation), the current road conditions (wet or icy conditions may require greater separation), and the type of source and/or lead vehicles (larger vehicles may require more stopping distance and, hence, greater separation), to name but a few possibilities. As will be explained, the headway control setting can be used in a variety of appropriate low speed environments, including stop-and-go situations in traffic where the vehicle is brought to a complete stop. In that case, it is possible for brake controller computer 32 to maintain the vehicle in a stopped position until the driver is ready to resume driving and the lead vehicle is no longer in the immediate pathway.

Driver interface 34 provides the operator with an audible, visual and/or haptic interface for exchanging information with cruise control system 10, and can generally function as an input or output device. In one example of an input device, driver interface 34 could receive audible commands from the driver, convert the audible commands into electronic signals with speech recognition software, and transmit that interface input to adaptive cruise computer 20. In this example, the driver interface could be used in addition to or in lieu of cruise switches 22. As an output device, driver interface 34 could convey status information, such as alerting the driver that cruise control system 10 has been deactivated because it is operating in an inappropriate low speed environment. This could be accomplished by using any combination of telltales, text messages, graphical displays, audible signals, haptic indications, as well as any other known techniques for communicating with the driver.

For more information on aspects of suitable cruise control systems, please refer to U.S. Pat. Nos. 6,622,810; 6,223,117 and 5,454,442, all of which are assigned to present assignee and are incorporated herein by reference.

Method for Operating Cruise Control System—

Figure 2:
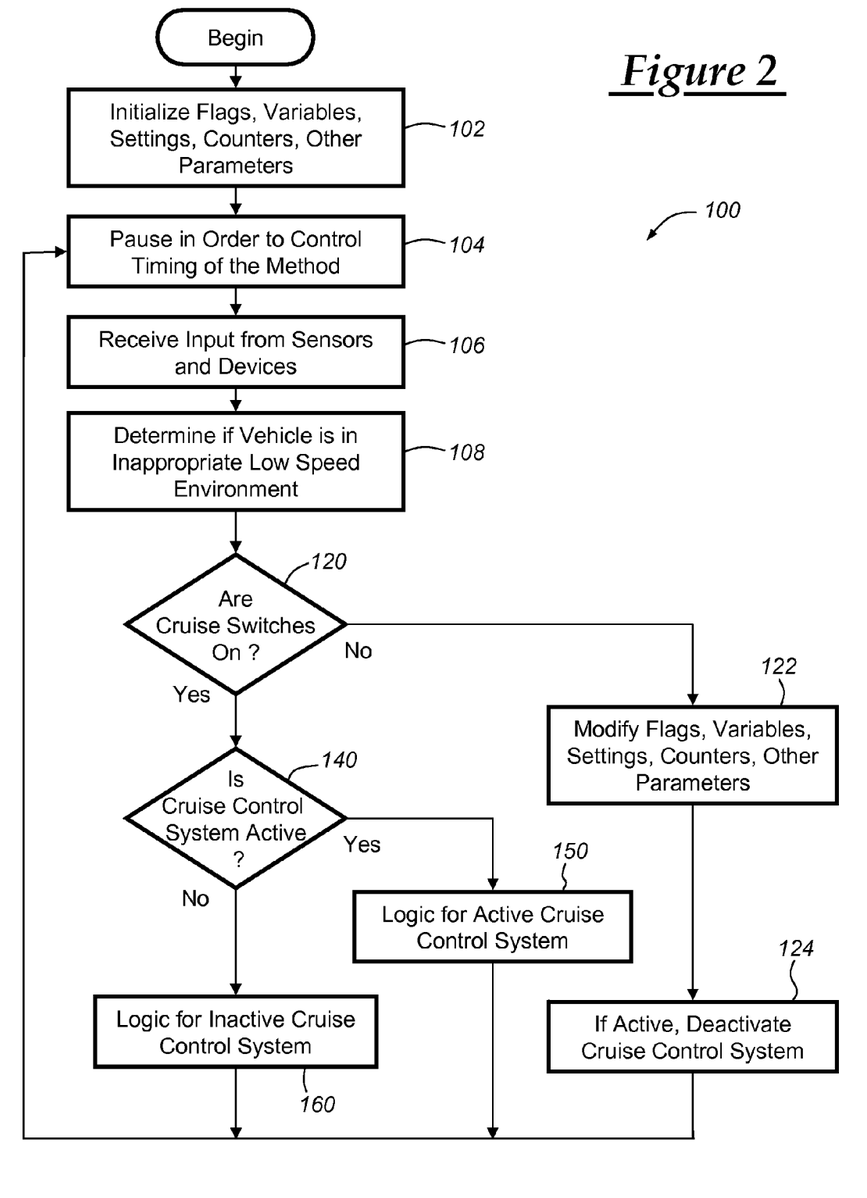
FIG. 2 is a flowchart showing some of the steps of an embodiment of the present method.

The flowchart in FIG. 2 shows some of the steps of an exemplary embodiment 100 of a method for operating a cruise control system. Some adaptive cruise control (ACC) systems are designed to turn off below a certain vehicle speed, say 25 mph, as they may be unable to accurately distinguish between appropriate low speed environments—like stop-and-go traffic situations—where usage of such a system is desirable, and inappropriate low speed environments—such as parking lots—where cruise control is not suitable. The present method generally can expand the applicability and effectiveness of cruise control systems by distinguishing between appropriate and inappropriate low speed environments, and by taking actions accordingly. The term 'inappropriate low speed environment' broadly includes all environments and settings where a vehicle is being operated at a low vehicle speed and usage of a cruise control system is not suitable. Some examples of inappropriate low speed environments include, but are certainly not limited to, parking lots, parking structures, and other locations where numerous pedestrians and other non-vehicle obstacles are present.

Beginning with step 102, one or more flags, variables, counters, settings and/or other parameters stored in adaptive cruise computer 20 are initialized. For example, an Inappropriate_Environment flag and a Driver_Speed variable can be set to '0' (these items will be subsequently discussed in more detail). According to one embodiment, step 102 occurs each time the vehicle is started by an operator or is otherwise powered up. Once these items have been properly initialized, control passes to step 104 which generally controls the timing of the method by dictating the overall rate at which the method is executed. Put differently, step 104, which is an optional feature and is not necessary, momentarily pauses execution of the method so that the subsequent steps can be performed according to a predetermined and predictable rate; for instance, one execution of the method every 50 msec. Once the timer in step 104 expires, execution of the method continues at step 106.

In step 106, adaptive cruise computer 20 receives one or more inputs from sensors and devices located around the vehicle including, according to one embodiment, a steering input from steering wheel sensor 28, a speed input from a vehicle speed sensor, switch input from cruise switches 22, as well as other input from vehicle sensors 30. The steering input generally pertains to a steering wheel position and can be obtained according to a variety of ways known in the art. For instance, Hall Effect-type sensors could be placed in and around the steering column in order to gather information regarding the rotational position of the steering wheel. Other types of sensors and techniques could also be used. The speed input generally pertains to a vehicle speed and can be provided by one of a number of sources, including sensors in communication with ECM/TCM 24. The switch input generally indicates the operational state of the various cruise control switches; i.e.—the on/off switch, set speed switch, resume/accelerate switch, cancel switch, etc. Depending on the particular embodiment, step 106 could also gather information from other sources around the vehicle, like vehicle door status information from vehicle sensors 30.

It should be appreciated that in step 106, as well as other steps in method 100, the inputs could be requested by adaptive cruise computer 20, they could be sent by the sensors without being asked to do so, or they could be gathered according to other suitable signaling techniques known to people skilled in the art. Furthermore, the various inputs could be representative of a single reading or of multiple readings, in which case they could be provided as some type of average. Conditioning, filtering, and other signal processing techniques could also, of course, be applied to the inputs.

Figure 3:
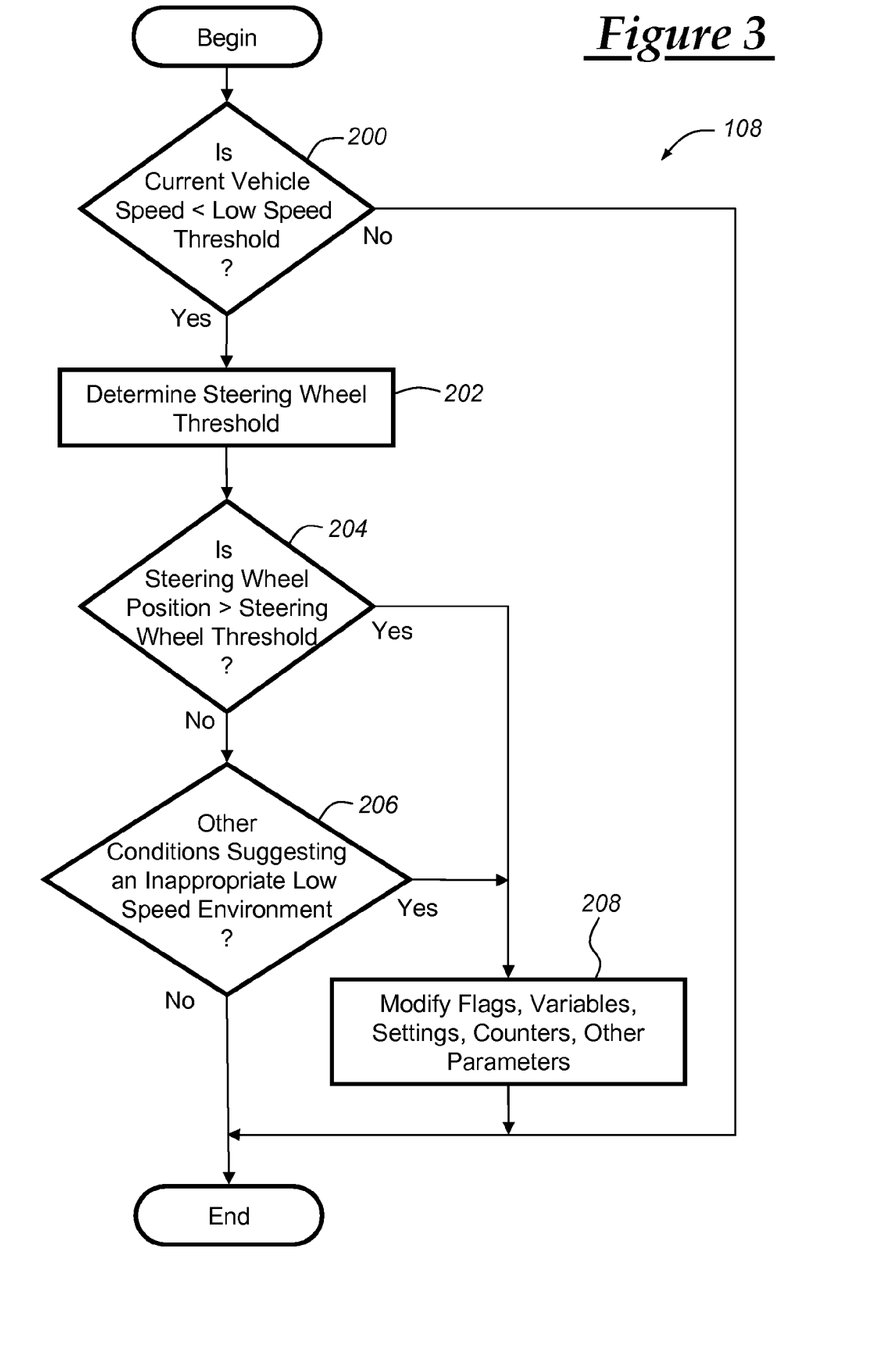
FIG. 3 is a flowchart showing some of the steps of a more detailed embodiment of step 108 from FIG. 2.

Next, the method determines if the vehicle is operating in an inappropriate low speed environment, step 108. With reference to FIG. 3, there is shown a flowchart that shows an embodiment of step 108 in greater detail. In a first step 200, the speed input gathered in step 106 is used to determine if the current vehicle speed is less than a low speed threshold; for instance 25 mph. If the vehicle is operating at a speed greater than the low speed threshold, then the vehicle is not operating in a low speed environment—appropriate, inappropriate, or otherwise. In this case, step 108 ends and control passes to step 120. If the vehicle is operating at a speed that is less than the low speed threshold, then the vehicle is operating in a low speed environment and control passes to step 202, which begins the process of determining if the low speed environment is an appropriate or inappropriate one.

In step 202, the method determines a steering wheel threshold that can be used to identify certain inappropriate low speed environments, such as parking lots. Because tight turning radiuses are often encountered in certain low speed settings like parking lots and parking structures, the present method can determine a steering wheel threshold for subsequent comparison and use. The steering wheel threshold can either be a constant value, such as 90° for example, or it can be a variable value dependent upon one or more factors. According to one embodiment, the steering wheel threshold is a speed-dependent value; the lower the vehicle speed, the greater the steering wheel threshold needs to be to identify a parking lot or parking structure (a turn of 45° may indicate the presence of a parking lot when the vehicle is traveling at 15 mph, but not at 5 mph, for example). The steering wheel threshold can also take other factors into account, such as the type of vehicle involved, the steering ratio of the vehicle, hysteresis, etc., and it can be derived through performing calculations or through the use of stored information such as look-up tables. These are, of course, only a few exemplary techniques for determining the steering wheel threshold, as numerous others also exist and could be used.

In step 204, the method then compares the steering input gathered in step 106 to the steering wheel threshold derived in step 202. If the steering wheel position sensed by steering wheel sensor 28 is not greater than the steering wheel threshold, then step 206 is performed to see if there are any other conditions indicative of a parking lot or other inappropriate low speed environment. Some examples of such conditions include, but are not limited to, if one or more of the vehicle doors, trunk, or hood have been opened. Input regarding the status of the doors, trunk, hood, etc. could be obtained in step 106 from vehicle sensors 30 or any other suitable device. If any of these items have been opened, it suggests that the vehicle may be in an environment where a cruise control system is not fitting, and the method thus proceeds to step 208. If no inappropriate low speed environment conditions are sensed by step 206, then it is determined that the vehicle is not in an inappropriate low speed environment and step 108 ends with control passing back to step 120. Of course, the criteria used in step 206 could include one or more combinations of factors. For instance, instead of simply checking to see if a vehicle door has been opened, step 206 could require that a vehicle door be opened for a certain amount of time while the vehicle is stationary. This type of qualification can reduce errors caused by faulty door switches, etc.

If, on the other hand, either step 204 or step 206 detects conditions indicative of an inappropriate low speed environment, then step 208 can make changes to one or more pieces of electronically stored data. For instance, step 208 can set, modify, increment, or otherwise change one or more of the flags, variables, counters, settings and/or other parameters used by the present method. According to one embodiment, the Inappropriate_Environment flag—which was previously initialized in step 102—is set to '1', indicating that an inappropriate low speed environment has been detected, and the Driver_Speed variable is cleared. It should be appreciated that one of any number of different techniques could be used in step 208 to recognize or record that an inappropriate low speed environment has been encountered, and that the flag-setting method generally described above is just one possibility. At this point, step 108 has determined whether or not the vehicle is currently operating in an inappropriate low speed environment, and it has accomplished this without the use of electronic map data. Of course, different embodiments could use GPS coordinates and electronic map data for purposes of corroboration, however, they do not rely on electronic map and therefore avoid issues relating to spotty reception of GPS signals, electronic map data that is out-of-date, etc.

Referring back to FIG. 2, the method proceeds to step 120 and checks the status of the cruise switches 22. Using the switch input from step 106, it is determined if the driver has engaged the cruise control system by checking the status of the various cruise switches 22. If cruise switches 22 are 'off', indicating that the driver does not wish to engage cruise control system 10, then one or more flags, variables, counters, settings and/or other parameters are reset, initialized, cleared, etc., in step 122. In one embodiment, a System_Active flag, which generally indicates whether or not the cruise control system is currently active, is cleared, and the Driver_Speed variable is cleared or set to '0'. If the system is currently active, then step 124 deactivates the system by disengaging the cruise control features and passing control back to step 104 so that the process can be repeated again.

Figure 4:
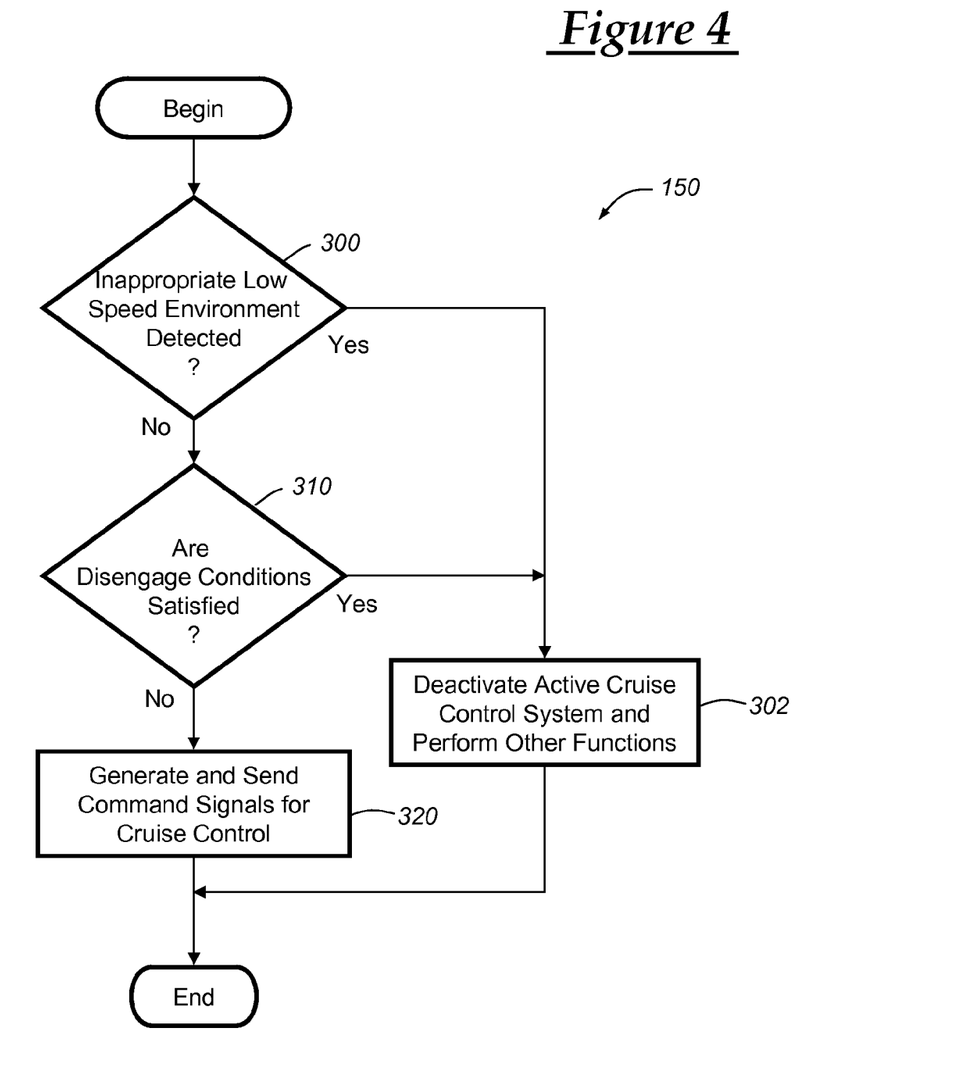
FIG. 4 is a flowchart showing some of the steps of a more detailed embodiment of step 150 from FIG. 2.
Figure 5:
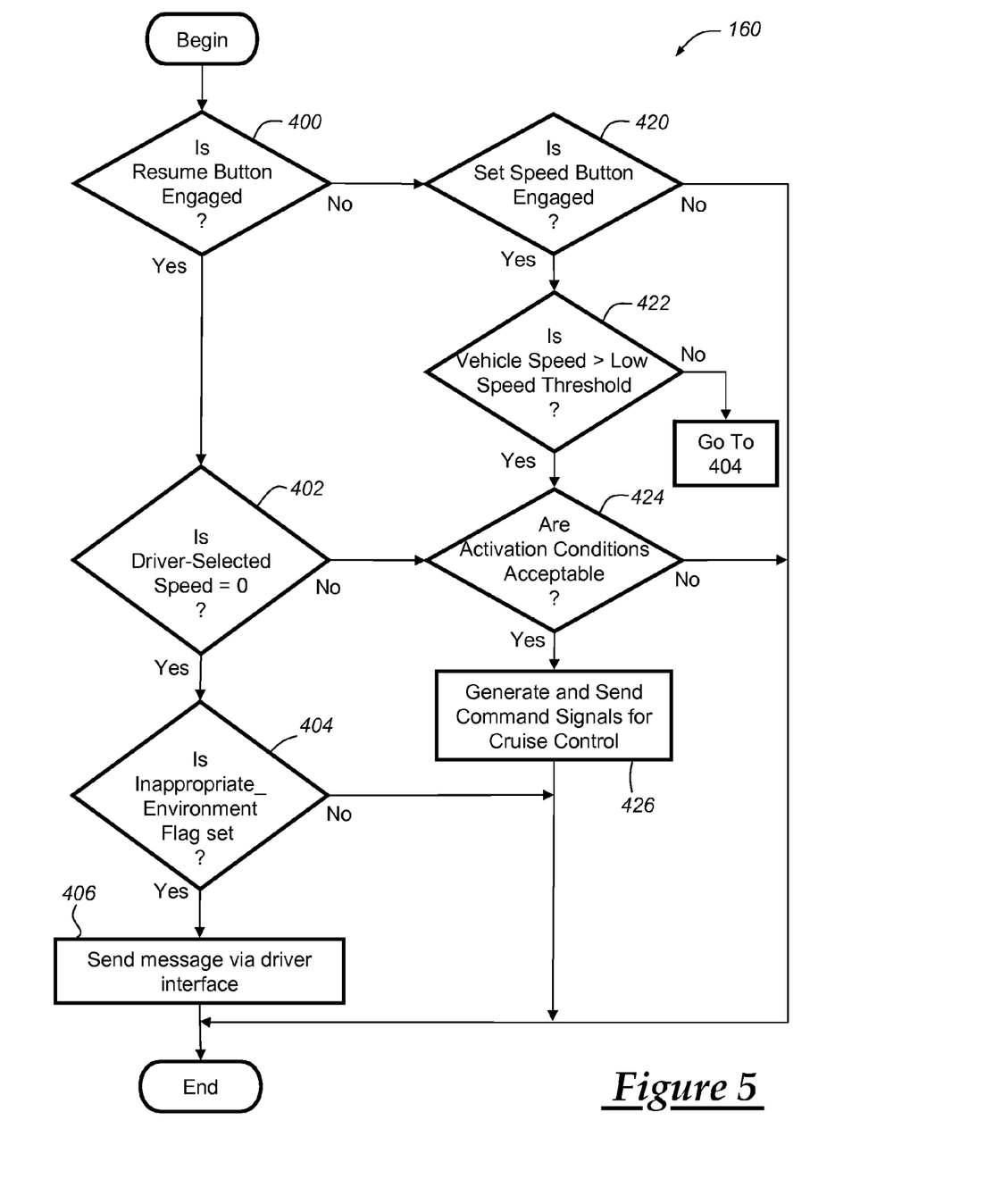
FIG. 5 is a flowchart showing some of the steps of a more detailed embodiment of step 160 from FIG. 2.

If step 120 determines that cruise switches 22 are in fact 'on', then step 140 inquires about the current status of cruise control system 10 (i.e.—is it active or inactive). Generally speaking, if an inappropriate low speed environment was previously detected, then the present method disables the cruise control system; the precise nature of how this disablement is performed can vary and is dependent on several factors. For example, if cruise control system 10 is currently active and an inappropriate low speed environment was detected, then the system is disabled by deactivating it so that the vehicle can no longer operate in a cruise control mode (this approach is generally shown in FIG. 4). If cruise control system 10 is already inactive and an inappropriate low speed environment was detected, then the cruise control system is disabled by preventing it from being activated while it is still in the inappropriate low speed environment (this approach is generally shown in FIG. 5). Other techniques for disabling the cruise control system can also be used, as the preceding embodiments are only two possibilities.

Turning to FIG. 4, there is shown a flowchart that illustrates a more detailed embodiment of step 150, which generally pertains to active systems. Beginning with step 300, the method determines if an inappropriate low speed environment was last detected; in one embodiment, this is achieved by checking the status of the Inappropriate_Environment flag. If an inappropriate low speed environment was identified, then cruise control system 10 is disabled in step 302 by taking the following actions: deactivating the cruise control system so that it is 'off', sending a message to driver interface 34 providing it with an explanation for the deactivation, and clearing or resetting one or more flags, variables, counters, settings and/or other parameters (this can include clearing the Driver_Speed variable and the System_Active flag). In this embodiment, cruise control system 10 will continue to be prevented from operating until the Inappropriate_Environment flag is changed. This can have the beneficial effect of reducing unwanted 'resumes' where a driver resumes operation of the cruise control system while the vehicle is still in an inappropriate low speed environment.

Returning to step 300, if no inappropriate low speed environment was detected, then the method checks to see if any other disengage conditions have been satisfied, step 310. Disengage conditions can include instances such as the driver pressing the cancel switch or if a fault is detected that prevents continued operation of the cruise control system. If any of these types of conditions exist, then control passes to step 302 so that the system can be disabled, as just explained. If no disengage conditions exist, then the method generally concludes that it is alright to operate cruise control system 10 and step 320 generates command signals for ECM/TCM 24, brake controller computer 32, as well as any other devices needed to implement the cruise control, as is generally known in the art. The command signals can include a desired speed that controls the vehicle in a speed control setting, or they can include output used to follow a lead vehicle or to keep the vehicle stopped in a headway control setting. At this point step 150 is complete and control passes back to step 104 so that the whole process can be repeated.

If step 140 determines that the cruise control system is inactive, then step 160 is executed; an exemplary embodiment of which is shown in FIG. 5. Generally, step 160 will activate cruise control system 10 if the driver has attempted to utilize the cruise control features and it is deemed alright to do so; i.e.—not in an inappropriate low speed environment. Beginning with step 400, the method checks to see if the resume/accelerate button, which is part of cruise switches 22, has been engaged; the acquisition of switch input could be part of step 106. Step 402 then determines whether or not the driver-selected speed is '0'. If the driver-selected speed is '0', then step 404 checks the Inappropriate_Environment flag to see if it is set to '1'; a setting of '1' indicates an inappropriate low speed environment. If the Inappropriate_Environment flag is set to '1', then a message is provided to the driver via driver interface 34 explaining to them that the cruise control system cannot be activated because the vehicle is in an inappropriate low speed environment, step 406. After which, control is sent back to step 104 so that the process can be repeated. If step 404 determines that the Inappropriate_Environment flag has not been set but that the driver selected speed is '0', then the method simply proceeds to step 104 without sending a message through driver interface 34.

Returning to step 400, if this step determines that resume/accelerate button has not been engaged by the driver, then step 420 reviews the status of the set speed switch. If the set speed switch has not been engaged, then step 160 ends and control returns to step 104. If, however, the set speed button has been engaged by the driver, then the current vehicle speed is compared to a low speed threshold, step 422. If the vehicle is currently being driven at a velocity that is less than the low speed threshold, then the method proceeds to step 404 to check the status of the Inappropriate_Environment flag, as already explained. Conversely, if the vehicle is traveling at rate that exceeds the low speed threshold, then step 424 makes sure that certain engagement conditions are satisfied and, assuming that they are, cruise control system 10 is activated and generates command signals for ECM/TCM 24, brake controller computer 32, etc. according to either a speed control setting or a headway control setting, as is known in the art, step 426. This step can also set the System_Active flag, clear the Inappropriate_Environment flag, and perform other needed changes to system parameters.

Some of these steps, particularly those pertaining to aspects of managing a cruise control system in either a speed control setting or a headway control setting, may already be known to those skilled in the art, and are provided as an exemplary background against which the present method can be used. Thus, the method described herein could certainly be used with sequences and/or steps other than those discussed above, etc.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method for operating a cruise control system for a vehicle, comprising the steps:
   (a) receiving steering input from a steering wheel sensor, wherein the steering input generally pertains to a steering wheel position;
   (b) comparing the steering wheel position to a steering wheel threshold, comparing a current vehicle speed to a low speed threshold, and using both the comparison for the steering wheel position and the comparison for the current vehicle speed to determine if the vehicle is operating in an inappropriate low speed environment where usage of the cruise control system is not suitable; and
   (c) disabling the cruise control system if the vehicle is operating in an inappropriate low speed environment.

2. The method of claim 1, further comprising the step of: determining if there are other conditions, besides steering wheel position, that indicate that the vehicle is operating in an inappropriate low speed environment, wherein this step is performed before step (c).

3. The method of claim 1, wherein step (b) further comprises determining if the vehicle is operating in an inappropriate low speed environment without the use of electronic map data.

4. The method of claim 1, wherein step (c) further comprises disabling the cruise control system by taking at least one of the following two actions: i) deactivating the cruise control system if it is currently in an active state, or ii) preventing the cruise control system from being activated if it is currently in an inactive state.

5. The method of claim 1, wherein the cruise control system is a full speed range adaptive (FSRA) cruise control system and can operate in both speed control and headway control settings when in an appropriate low speed environment.

6. A method for operating a cruise control system for a vehicle, comprising the steps:
   (a) receiving steering input from a steering wheel sensor, wherein the steering input generally pertains to a steering wheel position;

(b) determining a steering wheel threshold by using one or more pieces of information selected from the list consisting of: a vehicle speed, a vehicle type, or a steering ratio, and then comparing the steering wheel position to the steering wheel threshold to determine if the vehicle is operating in an inappropriate low speed environment; and (c) disabling the cruise control system if the vehicle is operating in an inappropriate low speed environment.

7. The method of claim 6, wherein the steering wheel threshold is determined by using the vehicle speed so that the lower the vehicle speed the higher the steering wheel threshold.

8. A method for operating a cruise control system for a vehicle, comprising the steps:
   (a) receiving steering input from a steering wheel sensor, wherein the steering input generally pertains to a steering wheel position;
   (b) comparing the steering wheel position to a steering wheel threshold to determine if the vehicle is operating in an inappropriate low speed environment, and determining if there are other conditions, besides steering wheel position, that indicate that the vehicle is operating in an inappropriate low speed environment; and
   (c) disabling the cruise control system if the vehicle is operating in an inappropriate low speed environment;

wherein the other conditions include at least one condition selected from the list consisting of: vehicle door status, vehicle trunk status, or vehicle hood status.

9. A cruise control system for use with a vehicle, comprising:
   an adaptive cruise computer;
   a vehicle speed sensor coupled to the adaptive cruise computer, the vehicle speed sensor provides speed input generally pertaining to a current vehicle speed; and
   a steering wheel sensor coupled to the adaptive cruise computer, the steering wheel sensor provides steering input generally pertaining to a steering wheel position;
   wherein the adaptive cruise computer is configured to compare the steering wheel position to a steering wheel threshold, to compare the current vehicle speed to a low speed threshold, to use both the comparison for the steering wheel position and the comparison for the current vehicle speed to determine if the vehicle is operating in an inappropriate low speed environment where usage of the cruise control system is not suitable, and to disable the cruise control system if the vehicle is operating in an inappropriate low speed environment.

* * * * *